Jan. 10, 1939.   C. HART   2,143,774
TREATMENT OF DOLOMITE FOR PRODUCING MAGNESIA ALBA AND LIME PRODUCTS
Filed March 30, 1936   2 Sheets-Sheet 2

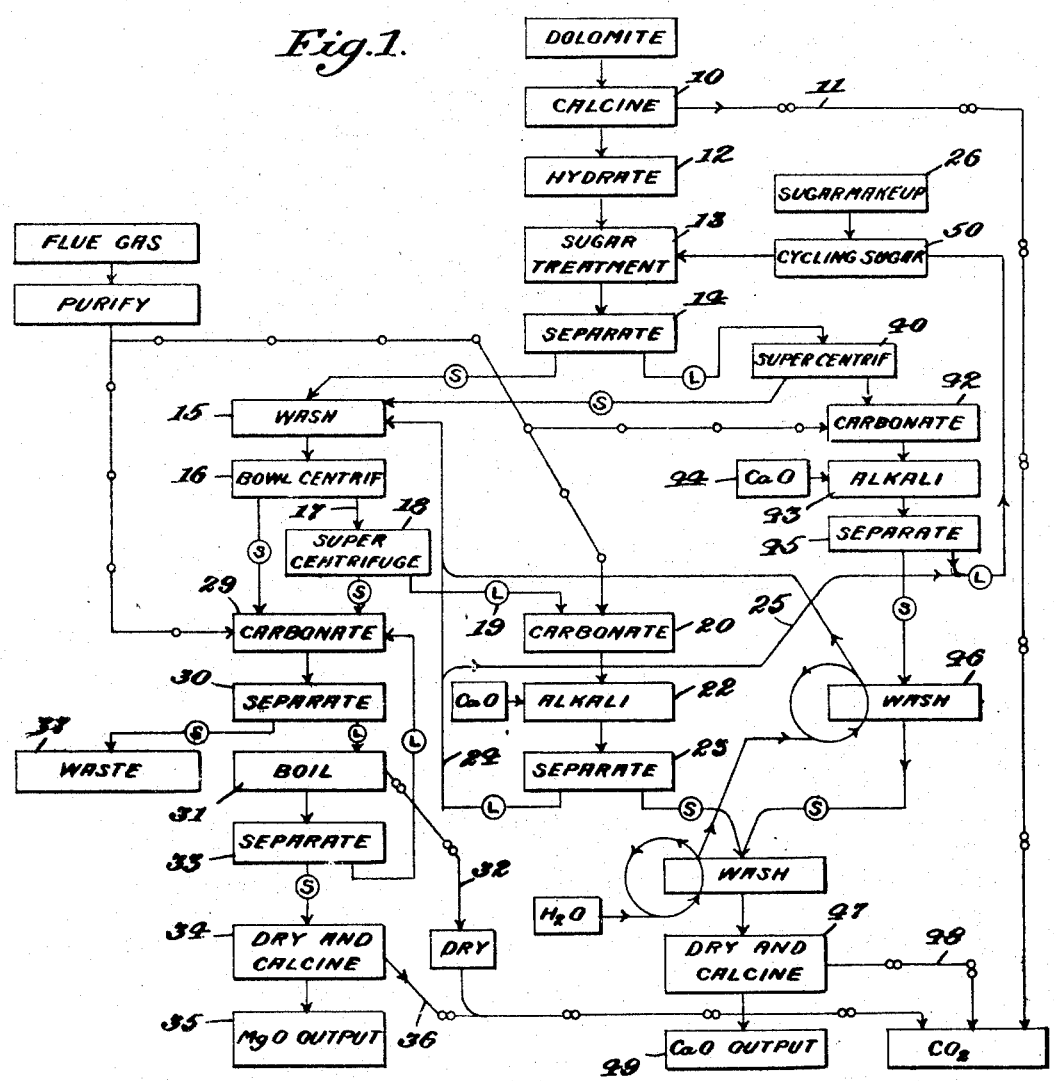

Inventor:
Charles Hart,
by Mason Porter,
Attys.

Patented Jan. 10, 1939

2,143,774

UNITED STATES PATENT OFFICE 2,143,774

TREATMENT OF DOLOMITE FOR PRODUCING MAGNESIA ALBA AND LIME PRODUCTS

Charles Hart, Chester, Pa.

Application March 30, 1936, Serial No. 71,740

5 Claims. (Cl. 23—66)

The present invention relates to the treatment of magnesium-calcium compounds for the separation of these elements in the form of substantially pure compounds.

A number of naturally occurring minerals and technical wastes contain a mixture of magnesium and calcium compounds in the form of carbonates. These compounds are known by various geological and commercial names, and are hereinafter referred to generally as "dolomites"; and embrace both the low-calcium and high-magnesium matters and low-magnesium and high-calcium matters, as well as the chemically true dolomites in which the magnesium and calcium are present in equivalent proportions.

There is a large market demand for magnesium carbonates and oxides which are substantially free from calcium, and also for lime compounds which are substantially free from magnesium. Natural sources of supply are inadequate to supply the demand at a reasonable price. For example, a considerable premium is now paid for magnesia compounds containing less than 6 percent of impurities.

According to the present process, these mixtures (chemically or mechanically) containing magnesium and calcium may be treated to separate the two elements in the form of substantially pure compounds by employing the selective solubility of the lime constituents in sugar solution under proper conditions, and the selective carbonation of magnesium.

Illustrative forms of practicing the invention are shown by the flow sheets on the accompanying drawings, in which:

Figure 1 illustrates the procedure of separating a dolomite and obtaining a magnesium oxide of better than 98 percent purity, along with a calcium oxide of similar grade.

Figure 3:
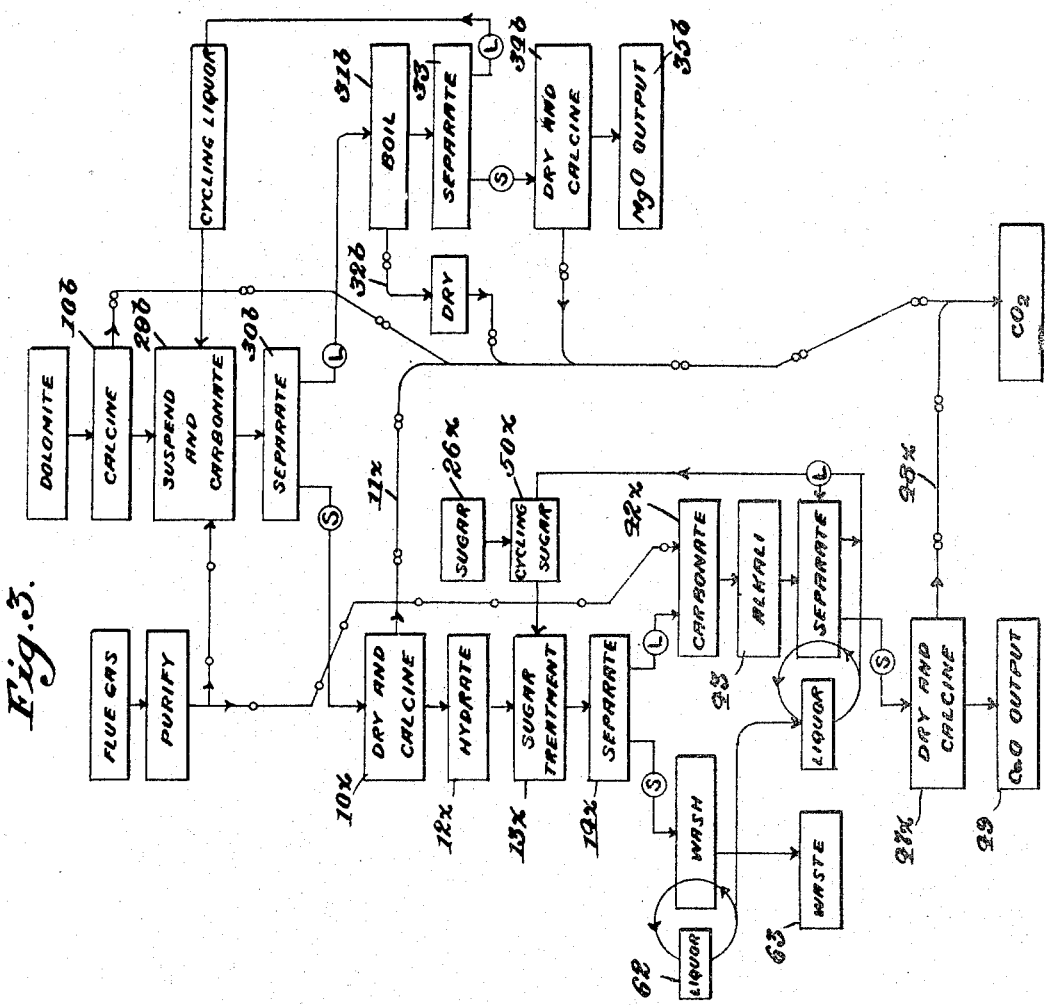
Figure 3 illustrates a further modification, in which a part of the magnesium is eliminated prior to the sugar treatment.

In these illustrative examples of practice, the dolomite is calcined to reduce the carbonates substantially to oxide form. This calcination may be accomplished at any desired temperature. It is advantageous to employ temperatures around 900 to 1100 degrees in order to effect the elimination of as large as possible a quantity of carbon dioxide and thus reduce the ignition loss of the product made.

In the form shown in Fig. 1, a commercial dolomite is calcined in the step 10 so that 157 parts by weight give to quantity 11 of carbon dioxide amounting to 73 parts, constituting 98.6 percent of the total-contained carbon dioxide. This product is then subjected to a hydration 12 and gives a material having an analysis of magnesium oxide 34.97; calcium oxide 46.48; silicon dioxide 0.04; and combined ferric and aluminum oxides (hereinafter briefly referred to as $R_2O_3$) of 0.66, and comprising 100 parts of matter. This material therefore is a hydrate of lime of the type known as "Corson Superfine."

This hydrated material is then subjected to a sugar solution treatment 13 with an aqueous liquid comprising 1117 parts of water to 283 parts of sugar (substantially a 20 per cent sugar solution) at a temperature of around 80 to 100 degrees F. for maintaining fluidity. The solution is stirred thoroughly at intervals and then permitted to stand for several hours, whereupon it is subjected to a decanting operation 14 to separate about 90 percent of the contents of the vessel as liquid. The solids at the bottom comprise most of the magnesium oxides and such impurities as the silica, alumina and iron oxides, and is then made up with 1000 parts of water and subjected to a stirring and washing operation 15 for withdrawing the sugar remaining with this solid matter. The mass is thinly liquid and settles quickly, and is subjected to an ordinary centrifugal action in a bowl centrifuge 16, the discharged liquid then being subjected to a further separation in a supercentrifuge 18 for removing any floating magnesium oxide 27 which has been carried off with the liquid.

The liquor from this supercentrifuge is a dilute sugar solution containing about 5.48 parts of calcium oxide in the form of calcium sucrate. It is subjected to a carbonation operation 20 with carbon dioxide, testing a few drops from time to time with phenolphthalein. When the introduction of carbon dioxide has caused the test specimen to effect a change in color of the indicator, it is terminated, and a small quantity 22 of calcium oxide is added immediately to reprecipitate any calcium acid carbonate which has been formed and to render the solution alkaline for the purpose described hereinafter. This dilute solution is thinly fluid and is permitted to settle and then subjected to a decanting and preferably a centrifugal separation operation 23. The effluent liquid 24 is a dilute sugar solution which can be employed in cycle for the washing operation 15 described above, while portions 25 are returned from time to time for making up the original sugar solution for the treatment 13.

The solid matter from the centrifugal separation 16 is introduced into a closed tank and made up with 2500 parts of water and subjected to a carbonation with carbon dioxide. In particular, this carbonation operation is preferably effected by the use of a purified flue gas, that is, one from which tar and hydrocarbon matters and sulphur compounds have been eliminated by controlling the combustion and scrubbing the gas. It is preferred to operate this carbonation 29 under increased pressure corresponding to a partial pressure of ½ to 2 atmospheres or higher of carbon dioxide, in order to assure the presentation of a proper quantity of carbon dioxide to the suspended solids. The inert gases (such as nitrogen) operate to effect a thorough stirring agitation of the suspension during the course of this carbonation. Further, quantities 27 and 41 of magnesium oxides, as herein described, are likewise preferably introduced into this vessel and subjected simultaneously to this carbonation. A method of controlling the carbonation is to regulate the quantity of carbon dioxide independently of the pressure prevailing in the carbonation vessel. Different rates of flow affect the course of the operation and permit a control of the end products in an expeditious manner. When the rate of flow is so great that all of the carbon dioxide of the gases is not taken up by the liquor, the effluent gases may be utilized elsewhere in the system at points where high effective concentrations of carbon dioxide are not important. Thus, it may be introduced for the carbonation operations 42 or 20. Finally, any major residue of carbon dioxide may be picked up by passing it into a vessel containing milk of lime derived from the final lime product 49 as described herein, this lime then being introduced again to the calcining operation 47.

As a result of the carbonation treatment 29, the magnesium and calcium oxides are converted firstly to the corresponding carbonates, and then the continued introduction of carbon dioxide leads to a selective further carbonation of the magnesium carbonate with respect to the calcium carbonate, and substantially all of the magnesium carbonate is converted to the soluble magnesium acid carbonate before any substantial portion of the calcium carbonate is similarly rendered soluble.

The carbonating is terminated and the liquid is subjected to a settling and filtering operation 30, the solids 37 from this operation comprising 7.8 parts having an analysis of magnesium oxide 18.6; calcium oxide 58.4; and alumina, silica and iron oxides of 23.00; this is normally discarded but is obviously also feasible of re-introduction for a calcining, sugar treatment, etc., for separating its values. The effluent solution from the separating operation 30 is subjected to a boiling operation 31 to break up the magnesium acid carbonate and effect the evolution of a quantity 32 of carbon dioxide amounting to 19 parts. The magnesium carbonate is re-precipitated by the boiling operation and is subjected to a filtering operation 33, the aqueous liquid being returned in cycle as a part of the water introduced for the carbonating operation 29 in the course of the cycle. The solids comprise a magnesia alba of high purity, and may be dried and subjected to a calcining operation 34 at a temperature of around 1000 degrees C., giving rise to the evolution of a quantity 36 amounting to 27.2 parts of carbon dioxide. The analysis of the calcined product 35 shows a content of magnesium oxide 98.37; calcium oxide 1.17; alumina, silica and iron oxide of 0.46; constituting 31.3 parts.

The liquid from the decanting operation 14, as stated, comprises about 90 percent of the original sugar solution, and contains 39.32 parts of calcium oxide, with floating particles of magnesium oxide therein. It is subjected to separation in a centrifuge 40 for removing the particles 41 of magnesium oxide, while the effluent liquid is subjected to a carbonation operation 42 by the introduction of carbon dioxide as at the carbonation operation 20, testing for the end point with a few drops by using phenolphthalein as an indicator, is immediately alkalized with calcium oxide, and subjected to a decanting and preferably centrifugal separation operation 45. The solid matter 46 is calcium carbonate, which is mixed with the calcium carbonate from the separation 23, subjected to a calcining operation 47, resulting in the production of a quantity 48 amounting to 34.5 parts of carbon dioxide, and the production of a quantity of quick lime 49 representing 44.84 parts and having an analysis of calcium oxide 98.82; magnesium oxide 0.61; silicon dioxide none; $R_2O_3$, 0.57: this being a highly pure white quick lime in finely divided form and ready for service in the arts. A portion of this can be used for the alkalizing operations 22 and 44, as indicated, being recovered ultimately in the course of the continuous cycling.

The effluent liquid from the separation 45 is a recycling sugar solution 50 which is returned for the sugar treatment 13, and represents essentially 90 parts of the original sugar solution, the deficit being made up by introducing the strengthening cycling wash liquid 24 and by introducing the necessary quantity 26 of sugar from time to time to maintain the concentration of the sugar solution for the treatment 13. It is found generally that the loss of sugar amounts to less than 1 percent; and hence the operation is rendered economical.

By immediately alkalizing the carbonation products, the sugar is maintained in alkaline solution, and hence is not inverted but remains as sucrose, ready to form a corresponding quantity of calcium sucrate in the sugar treatments 13 and 15.

Thus it will be seen that an initial dolomite has been treated so that of its 34.97 parts of magnesium oxide, there has been gained 31.3 parts of a magnesium oxide having a purity of 98.37 percent; while the original 46.48 parts of calcium oxide by analysis has been regained as 44.8 parts of quick lime having a purity of 98.82 percent. These products are of exceptionally high commercial purity and are present in finely divided form, so that no grinding or further treatment is necessary for their use in many arts. Further, it will be noted that the carbon dioxide amounting to 153.7 parts has been captured during the course of the proceeding and constitutes a valuable by-product, as described and claimed in my copending application Serial No. 71,738, filed March 30, 1936.

Figure 2:
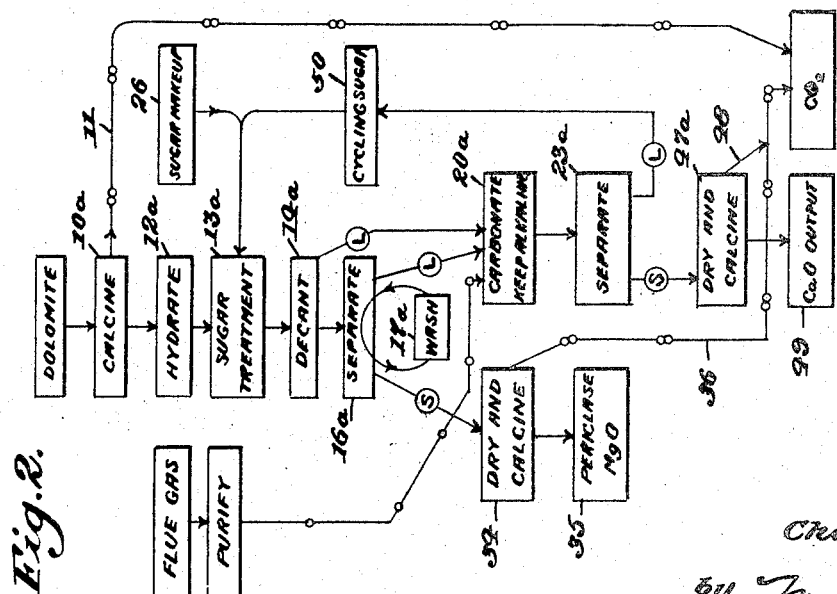
Figure 2 illustrates a modified form of practicing the invention, with a single sugar treatment.

Another example of practicing the invention is shown in Fig. 2. In this instance, the original dolomite had an analysis corresponding to magnesium oxide 21.36; calcium oxide 30.25; silicon dioxide 0.55; $R_2O_3$ 0.45; with an ignition loss of 47.33 percent. This dolomite was then subjected to a calcining operation 10a at 1000 degrees C., and the mixed oxides hydrated (12a) and subjected to a sugar treatment 13a. Each five parts of oxide material contains 1.068 parts of magnesium oxide and 1.512 parts of calcium oxide. The sugar solution was made up with 140 parts of water and sugar to constitute a 10 percent solution. The materials were agitated at intervals for a couple of hours and then permitted to stand overnight. As a result, the sugar solution deposited an undissolved mass and was decanted therefrom (14a) and passed to a centrifuge for separation 16a, the centrifuge cake being washed with a cycling water solution 17a which thus became successively enriched with sugar solution containing calcium sucrate. As before, this increasing sugar solution was ultimately employed, with added sugar, as a make-up for the sugar liquor being employed in the operation 13a.

The solids of the centrifugal cake from 16a were then subjected to drying and calcining operations 34. The residue constituted a magnesium oxide matter in quantity of substantially 1.1086 parts and having an approximate analysis of magnesium oxide 96.51; calcium oxide 1.12; $R_2O_3$ 1.84; and silicon dioxide 0.24. Thus, it corresponds to a burnt periclase of relatively high purity, and is capable of use in making insulators or like products in which such high purity is required.

The liquids from the decanting operation 14a and the originally separated liquor from the centrifuge 16a are brought into a closed vessel and subjected to a carbonation operation 20a as before, with the use of a proper indicator. The carbonation is so conducted that the solution is not rendered acid; or if rendered acid, a small quantity of lime is immediately introduced to restore it to alkaline state. The product is permitted to settle and is then separated by filtration and centrifugal effect (23a), with a recycling of the sugar solution back for the treatment 13a. The solids may be washed, if desired, and are then subjected to drying and calcining operations 41a, leading to the production of a further quantity of carbon dioxide and the derivation of 1.4609 parts of calcium oxide having an analysis of calcium oxide 99.00; magnesium oxide 0.01; $R_2O_3$ 0.56; silicon dioxide 0.00; ignition loss 0.45; corresponding to about 96 percent of the original calcium oxide of the dolomite, and being a quick lime of high purity and in finely divided form.

In this example, therefore, a clear separation has been effected for producing calcium oxide, while the magnesium oxide is likewise well separated from the calcium oxide. This particular operation is therefore advantageous where the specification requirement does not demand the relatively high purity from silica, alumina and iron oxides as can be obtained in the first example above. The product upon dead-calcining is an artificial periclass which can be utilized for insulation, etc.

A third manner of conducting the operation is set out in Fig. 3, where the original dolomite is subjected to a calcining operation 10b, and then is brought into water suspension and subjected to a carbonation 29b, by which the oxides are converted into carbonates, and then the magnesium carbonate is redissolved as acid magnesium carbonate. The end point is carefully determined to avoid an excessive resolution of calcium compounds. As before, this carbonation may be conducted by means of a flue gas purified of its content of sulphur compounds and other materials which might be deleterious to the purity of the final carbon dioxide produced in the course of the process.

The contents of the carbonation vessel are then separated (30b) to produce liquid and solid components: this suspension may be effected by decantation with filtration or centrifugal action, as before. The clear liquid is a solution of magnesium acid carbonate which is substantially free of silica, alumina or other matters, as these are maintained in undissolved form during the carbonation. This liquid is then subjected to a boiling operation 31b, by which the acid carbonate is broken up and a quantity of carbon dioxide 32b is regained as a by-product. The decomposition of the acid carbonate causes a precipitation of magnesium carbonate which is then subjected to a separation operation 33b, and the liquid (comprising principally water with small proportions of magnesium carbonate dissolved therein) is returned for use as the make-up liquor in the carbonation operation 29b. The solids from the separation 33b are then subjected to drying and calcining operations 34b by which substantially all of the carbon dioxide therein is regained as a quantity 36b. By calcining at a temperature of 1000 and 1400 degrees C., a magnesium oxide or magnesia alba product 35b of very high purity is obtained, the principal impurity being a fractional percentage of calcium oxide.

The solids from the separation 30b comprise calcium carbonate with the impurities of the original dolomite. These are then subjected to drying and calcining operations 10x, by which a quantity 11x of carbon dioxide is obtained along with a mass of mixed oxides which are subjected to a hydration 12x, and then to a treatment 13x with sugar solution. After this treatment has continued for a sufficient period, the matters are separated (14x) by decantation and/or filtration or centrifugal action as before, to give a sugar solution containing the calcium sucrate which is then subjected to a carbonation 42x by purified flue gas, as described above, with the same directions with respect to maintaining the solution on the alkaline side. The product is separated (45x) under the conditions described above, and the solid matter is dried and subjected to a calcining operation 47x by which a further quantity 48x of carbon dioxide is gained, while the ultimate residue is a calcium oxide of very high purity.

The sugar liquor from the separation 45x contains some calcium oxide and is recycled (50x) back for the treatment 13x. During the separation operation 45x, the filter or centrifugal cake may be subjected to a washing operation with water which is thus successively increased in concentration of sugar solution and calcium sucrate, and then may be enriched with make-up sugar 26x for compensating losses in the cycling sugar solution 50x.

The solids from the separation 14x comprise waste matters usually containing some magnesium oxide which was sacrificed at the carbonation operation 29b in order to avoid the passage of calcium into solution; and also contains some calcium oxide by reason of incompleteness in the sugar treatment 13x and separation 14x, along with substantially all of the silica, alumina and iron impurities of the original dolomite. This mass also contains some of the sugar solution which is adherent thereto, and is therefore subjected to a washing 61 by a cycling liquor 62 which is thus enriched in sugar and calcium sucrate, and may be utilized with the wash liquor from the separation 45x in making up the cycling sugar solution 50x. The solid matter from the washing 61 is usually rejected as a waste 63. It may contain as high as 20 or 30 percent of silica, with a corresponding percentage of alumina and iron oxides, the rest being lost magnesium and calcium oxides.

This form shown in Fig. 3 is therefore valuable when it is desired to make magnesium oxide and calcium oxide of high purity from dolomite or like matters, containing rather high percentages of silica, alumina, iron oxide, etc., as impurities.

It will be noted that a feature of the present invention is the employment of a sugar solution for dissolving lime and separating it from accompanying matters which remain undissolved by the sugar solution. It has been found in practice that sugar concentrations of 10 to 40 percent may be utilized. The lower concentrations require too large a space in apparatus for economical handling, while the higher percentages are thick and require greater care in the later separation both following the sugar treatment and following the carbonation. It is preferred to have the concentration around 20 to 30 percent. In each case the sugar solution is maintained alkaline for substantially its entire cycle, and thus inversion effects are successfully avoided. The successive washing and recovery of the wash liquors into the cycling sugar solution has the result that the actual sugar loss per cycle is less than 1 percent and usually runs far less than one-half of 1 percent. The rate of sedimentation of the sugar solution is a function of the concentration. For example, with a 10 percent sugar solution upon lime treatment, a 10 inch column settled to 0.75" in six hours; with a 20 percent solution, a similar column settled to 1.37" in six hours and 1.00" in 24 hours; with a 30 percent solution, the settlement was to 2.25" in six hours and 1.62" in 24 hours; and with a 40 percent solution, the settlement was to 6.5" in six hours, and 2.62" in 24 hours. Hence in employing the more concentrated sugar solutions, it is advantageous to follow the decantation with, or to substitute for it, a centrifugal separation by which the action is made more rapid; and then to reduce the quantity of remaining sugar liquor by a successive washing operation, with recovery of the sugar. Although various ratios of sugar to lime may be employed, it has been found that excellent results are obtained with the relative concentrations given above. By recycling the sugar solution, the calcium is obtained, in each instance, in the course of the recycling operation, even though a part of the calcium is carried back with the recycling solution for each individual part of the sequence. In continued recycling, it has been found that very little loss in efficiency of the sugar solution occurs, and that in many instances the recycled solution apparently accepts more lime than the original solution.

A particularly preferred manner of accomplishing the various separations is to employ a bowl centrifuge, and then to treat the liquor to separations in the so-called "supercentrifuge" by which a better parting is obtained. The speed of flow through the bowl separator has some effect on the course of the action. With a sugar solution at 12 percent concentration, and operating a particular centrifuge at 100 gallons per hour, the quantity of sediment in the effluent liquor was around 0.017 gram per hundred cc.; at 200 gallons per hour, these solids were 0.0194 gram; and at 300 gallons, around 0.055. At 25 percent concentration and 100 gallons per hour, the solids were 0.0020; at 200 gallons per hour, 0.0046; at 300 gallons per hour, 0.0168; and at 400 gallons per hour, around 0.2454.

The preferred manner of accomplishing the sugar treatment is to use a temperature of 80 to 100 degrees F., as this appears to avoid some thickening or gumming effects during the course of the procedure. The time of agitation with the sugar treatment is from 8 to 12 hours.

It will be noted that in each case the calcium is separated from other ingredients by the use of the cycling sugar solution, the calcium sucrate liquor being withdrawn and subjected to a carbonation under conditions which maintain the alkalinity of the solution for a maximum portion of the cycle. The magnesium oxide is thus separated from calcium, and preferably is washed to eliminate traces of the sugar solution and the accompanying calcium sucrate. The magnesium oxide is purified, when necessary or desired, by subjecting it to a carbonation operation until the magnesium acid carbonate is formed, while accomplishing a control to prevent resolution of calcium.

The active agent in dissolving out the calcium is saccharose or sucrose dissolved in water. It is unnecessary to employ the pure crystalline sugar, as relatively impure sugars may be employed without affecting the results disadvantageously. Thus, the molasses from beets or cane may be utilized, as these molasses contain as high as 30 percent or more of effective saccharose.

The procedure is accompanied by a recovery of large quantities of carbon dioxide which can be captured and employed for the many uses to which such material is adapted: this has also been disclosed and is claimed in my copending application Serial No. 71,738, filed March 30, 1936.

Further, certain phases of the operations set out above are given in further detail in my copending application Serial No. 71,739, filed March 30, 1936.

It is obvious that the invention is not limited to the particular forms of practice as set out in detail in the foregoing specification and on the flow sheets of the drawings, as it may be employed in many ways within the scope of the appended claims.

I claim:

1. The method of treating dolomite and like magnesian-lime carbonate matters containing iron oxide and like impurities for obtaining a purer magnesium compound, which comprises the steps of converting the matter to the form of mixed oxides of magnesium and calcium, treating the oxides with sucrose solution to dissolve the calcium oxide as calcium sucrate, separating sucrate liquor from undissolved residue, carbonating the liquor whereby to precipitate calcium as calcium carbonate and to re-form the sucrose solution, discontinuing the carbonation while the liquor is yet alkaline, separating the sucrose solution and returning it in cycle to dissolve further calcium oxide from mixed oxides, washing the said undissolved residue for removing the sucrate contained therein and for gaining the magnesium oxide substantially free of calcium compounds but mixed with impurities, carbonating the mixture of magnesium oxide and impurities in water suspension to form and dissolve magnesium acid carbonate, separating the liquid portion from the undissolved impurities and thereafter decomposing the magnesium acid carbonate to form magnesia alba.

2. The method of treating dolomite and like magnesian-lime carbonate matters for separating a pure magnesia alba therefrom, which includes the steps of calcining, effecting a first treatment with a recycled sucrose solution having a concentration of 20 to 30% of sucrose to remove calcium oxide as calcium sucrate, separating the major portion of the sucrate solution from solid residue and carbonating the solution to precipitate calcium carbonate and reform the concentrated sucrose solution, returning the sucrose solution in cycle for accomplishing the first treatment of further calcinate, effecting a second treatment of the said solid residue with sucrose solution of lesser concentration than said recycled sucrose solution for removing further calcium oxide as calcium sucrate, separating the second sucrate solution and separately carbonating the same to reform the second sugar solution and to precipitate calcium carbonate, returning the second sucrose solution in repeated cycles for sucrose solution treatment of further firstly-treated calcinate residue, from time to time introducing a portion of the second sucrose solution into the cycling sucrose solution for the first treatment for maintaining the volume thereof over the course of the repeated cycles, and adding sucrose for maintaining the concentration thereof, suspending in water the solids undissolved by said second treatment and carbonating the suspended solids to effect solution of magnesium as acid carbonate while keeping impurities in undissolved form, separating the magnesium solution from undissolved impurities and thereafter decomposing the magnesium acid carbonate to form magnesia alba.

3. The method of treating dolomite and like magnesian-lime carbonate matters for separating pure calcium compounds therefrom, which includes the steps of calcining, treating the calcinate at a temperature of 80 to 100° F. with a recycled sucrose solution of approximately 20 to 30% strength to produce calcium sucrate, permitting to stand and decanting the liquor from undissolved residue, centrifugally separating the liquor and carbonating the same to an end point short of acidity, centrifugally separating the carbonated sucrate liquor from calcium carbonate and immediately contacting the sucrose liquor in cycle with further calcinate and maintaining the sucrose liquor alkaline throughout its entire cycle, washing said undissolved residue with water, centrifugally separating the wash water in a bowl centrifuge and thereafter supercentrifugally separating the wash water to remove traces of suspended matter therefrom, carbonating the wash water for precipitating calcium carbonate and obtaining a weak sucrose solution, enriching the weak sucrose solution with sucrose and employing the enriched solution for maintaining the quantity and concentration of the cycling sucrose liquor, and recovering said quantities of calcium carbonate.

4. The method of treating dolomite and like magnesian-lime carbonate matters for obtaining a component high in calcium and low in magnesium and another component high in magnesium and low in calcium, which comprises the steps of calcining the matter, treating the calcinate in an aqueous sucrose solution having a concentration of 20 to 30% of sucrose to effect solution of calcium as calcium sucrate and leaving undissolved residue, withdrawing the sucrate liquor, carbonating the sucrate liquor to effect separation of calcium carbonate therefrom and re-form the sucrose liquor, terminating the carbonation while the liquor is yet alkaline whereby to maintain the sucrose solution alkaline for the entire course of cycling thereof, centrifugally separating sucrose solution from calcium carbonate and immediately contacting the solution with further initial calcinate, washing the undissolved residues and carbonating the same to separate magnesium acid carbonate from undissolved impurities, separating the liquor, and precipitating magnesium carbonate therefrom.

5. The method of treating dolomite and like magnesian-lime carbonate matters for separating pure calcium compounds therefrom, which includes the steps of calcining, treating the calcinate at a temperature of 80 to 100° F. with a recycled sucrose solution of approximately 20 to 30% strength to produce calcium sucrate, permitting to stand and decanting the liquor from undissolved residue, centrifugally separating the liquor and mingling the solids with said undissolved residue, passing purified flue gas through the centrifugally separated liquor whereby to form calcium carbonate by the action of the carbon dioxide in said gas and accomplishing a mechanical agitation by the insoluble constituents of the gas, terminating the carbonation at an end point short of acidity, centrifugally separating the carbonated sucrate liquor and other calcium carbonate and immediately contacting the liquor in cycle with further calcinate and maintaining the liquor alkaline throughout its entire cycle, washing said undissolved residue with water, carbonating the remaining residue in water suspension with purified flue gas under an increased pressure at which the partial pressure of carbon dioxide is in excess of one-half atmosphere, whereby the carbon dioxide of the gas is effective upon the magnesium oxide to produce magnesium acid carbonate and the insoluble constituents of the gas are effective for maintaining an agitation during carbonation, separating the liquid from residual solids, and precipitating magnesium carbonate from said liquid.

CHARLES HART.